US012571718B2

(12) United States Patent
Berg et al.

(10) Patent No.: US 12,571,718 B2
(45) Date of Patent: Mar. 10, 2026

(54) METHODS AND APPARATUS FOR CONTACTLESS ORTHOGRAPHIC IMAGING OF AEROSOL PARTICLES

(71) Applicant: Kansas State University Research Foundation, Manhattan, KS (US)

(72) Inventors: Matthew J. Berg, Manhattan, KS (US); Jesse Laning, Manhattan, KS (US)

(73) Assignee: Kansas State University Research Foundation, Manhattan, KS (US)

( * ) Notice: Subject to any disclaimer, the term of this patent is extended or adjusted under 35 U.S.C. 154(b) by 890 days.

(21) Appl. No.: 17/642,441

(22) PCT Filed: Sep. 18, 2020

(86) PCT No.: PCT/US2020/051469
§ 371 (c)(1),
(2) Date: Mar. 11, 2022

(87) PCT Pub. No.: WO2021/055732
PCT Pub. Date: Mar. 25, 2021

(65) Prior Publication Data
US 2023/0003632 A1      Jan. 5, 2023

Related U.S. Application Data

(60) Provisional application No. 62/903,355, filed on Sep. 20, 2019.

(51) Int. Cl.
*G01N 15/14*      (2024.01)
*G01N 15/00*      (2024.01)
(Continued)

(52) U.S. Cl.
CPC ....... *G01N 15/147* (2013.01); *G01N 15/0227* (2013.01); *G01N 15/1434* (2013.01);
(Continued)

(58) Field of Classification Search
CPC ............. G01N 15/147; G01N 15/1434; G01N 15/1436; G01N 2015/0046;
(Continued)

(56) References Cited

U.S. PATENT DOCUMENTS 8,947,662 B1      2/2015   Yufa et al.
10,416,060 B1     9/2019   Tatarkiewicz et al.
(Continued)

OTHER PUBLICATIONS

Kroll, Mattias, Lennart Muhlfeld, and Dietmar Block. "Stereoscopic digital holography." IEEE Transactions on Plasma Science 38.4 (2009): 897-900. (Year: 2009).*
(Continued)

*Primary Examiner* — Michelle M Iacoletti
*Assistant Examiner* — Noah J. Haney
(74) *Attorney, Agent, or Firm* — Hovey Williams LLP

(57)      ABSTRACT

Described herein are apparatus and methods for orthographic imaging of particles. Particularly, a method to obtain contact-free images of aerosol particles with digital holography from three orthogonal directions is described and demonstrated. Diode lasers of different wavelengths simultaneously illuminate free flowing particles to form holograms on three sensors. Images of the particles are reconstructed from the holograms and used to infer the three-dimensional structure of single spherical particles or clusters of sphere-like particles. The apparatus employs inexpensive components and requires no lenses to achieve the imaging, which gives it a large sensing volume and simple design.

18 Claims, 9 Drawing Sheets

(51) Int. Cl.

| | |
|---|---|
| *G01N 15/0227* | (2024.01) |
| *G01N 15/1434* | (2024.01) |
| *G06T 7/564* | (2017.01) |
| *H04N 25/13* | (2023.01) |

(52) U.S. Cl.
CPC . *G01N 15/1436* (2013.01); *G01N 2015/0046* (2013.01); *G01N 2015/0233* (2013.01); *G01N 2015/1445* (2013.01); *G01N 2015/1497* (2013.01); *G06T 7/564* (2017.01); *G06T 2207/10016* (2013.01); *G06T 2207/10152* (2013.01); *H04N 25/134* (2023.01)

(58) Field of Classification Search
CPC ... G01N 2015/1445; G01N 2015/1497; G01N 15/0227; G01N 2015/0233; G01N 21/453; G06T 7/564; G06T 2207/10016; G06T 2207/10152; H04N 25/134; G01B 9/021; G01B 9/023; G01B 9/025; G01J 2003/452
USPC ........................................................... 356/335
See application file for complete search history.

(56) References Cited

U.S. PATENT DOCUMENTS

| | | | | |
|---|---|---|---|---|
| 11,900,540 | B2 * | 2/2024 | Milne ........................ | G06T 7/20 |
| 2003/0086087 | A1 * | 5/2003 | Quist ................. | G01N 15/1456 |
| | | | | 356/338 |
| 2009/0027747 | A1 * | 1/2009 | Lee ........................ | G02B 21/32 |
| | | | | 359/30 |
| 2010/0166296 | A1 | 7/2010 | Sankoh et al. | |
| 2010/0326894 | A1 | 12/2010 | Palmgren et al. | |
| 2012/0140223 | A1 | 6/2012 | Mitchell et al. | |
| 2013/0242301 | A1 * | 9/2013 | Berg .................. | G01N 15/1434 |
| | | | | 356/336 |
| 2013/0308122 | A1 * | 11/2013 | Merchez ................ | G01N 21/47 |
| | | | | 356/72 |
| 2014/0009621 | A1 | 1/2014 | Tucker et al. | |
| 2014/0158212 | A1 * | 6/2014 | Vrane ................ | G01N 15/1404 |
| | | | | 137/12 |
| 2016/0377541 | A1 | 12/2016 | Knox et al. | |
| 2017/0153106 | A1 | 6/2017 | Ozcan et al. | |
| 2017/0258305 | A1 | 9/2017 | Hart et al. | |
| 2018/0052425 | A1 * | 2/2018 | Ozcan .................. | G03H 1/0866 |
| 2018/0284009 | A1 * | 10/2018 | Kaduchak ........... | G01N 21/532 |
| 2019/0139235 | A1 | 5/2019 | Wieneke et al. | |
| 2020/0201018 | A1 * | 6/2020 | Vaziri ........................ | G06T 7/11 |
| 2020/0285194 | A1 * | 9/2020 | Yurt ..................... | G03H 1/0465 |
| 2020/0326269 | A1 * | 10/2020 | Blandin ................... | G06T 7/62 |
| 2021/0116863 | A1 * | 4/2021 | Stahl .................... | G03H 1/0465 |
| 2021/0209337 | A1 * | 7/2021 | Ozcan ............... | G01N 33/1866 |

OTHER PUBLICATIONS

International Search Report and Written Opinion in corresponding PCT/US2020/051469, dated Dec. 9, 2020.

* cited by examiner

METHODS AND APPARATUS FOR CONTACTLESS ORTHOGRAPHIC IMAGING OF AEROSOL PARTICLES

CROSS-REFERENCE TO RELATED APPLICATIONS

The present application is the U.S. National Stage of International Patent Application No. PCT/US2020/051469, filed Sep. 18, 2020, which claims the priority benefit of U.S. Provisional Application No. 62/903,355, filed Sep. 20, 2019, entitled METHODS AND APPARATUS FOR CONTACTLESS ORTHOGRAPHIC IMAGING OF AEROSOL PARTICLES, each of which is incorporated by reference in its entirety herein.

STATEMENT REGARDING FEDERALLY SPONSORED RESEARCH

This invention was made with government support under Contract No. 1665456 awarded by the National Science Foundation (NSF). The government has certain rights in the invention.

BACKGROUND OF THE INVENTION

Field of the Invention

The present invention is generally directed to imaging apparatus and methods for forming a three-dimensional image of particles, and particularly free-flowing aerosol particles.

Description of the Prior Art

The ability to image particles micrometers in size in a three-dimensional (3D) manner is useful for many applications in medicine, science, and industry. For example, particle-type differentiation, and even identification in some cases, can be aided by the knowledge of a particle's 3D form. Such information is also useful to estimate particle volume. Methods are available to resolve or reconstruct the 3D form of particles of this size, such as confocal microscopy and X-ray, electron, or optical tomographic microscopy. In most cases, these methods require fixing particles to a transparent stage, trapping them optically, or confining them in a liquid. As such, they are not useful in cases where particles must be observed in free space without contact or confinement. Aerosols are one example where contact-free imaging is preferred to avoid shape-related particle collection artifacts, or is required, as is the case for ice or liquid-drop particles In a previous work with digital holography (DH), a particle or a collection of particles is illuminated by a laser beam and the interference pattern, i.e., hologram, produced by the particle's forward scattered light and the beam is recorded by a CCD sensor. Applying Fresnel-Kirchhoff scalar diffraction theory to the hologram then yields a silhouette-like 2D image of the particle from the perspective of the beam direction. By pulsing the laser at the ~200 ns time scale, free-flowing particles can be imaged, and a number of additional useful quantiles can be derived such as the particle's scattering pattern to and extinction cross section.

Other examples of 2D imaging include investigations of laboratory generated aerosols and the HOLODEC instrument, where cloud aerosol particles are observed from aircraft in the field. Other work that achieves 3D imaging via DH or related methods. However, in these cases, the particles under study are trapped or confined in some way such that they reside within the depth of focus of a microscope objective. This restricts the sensing volume to micrometers, or millimeters at most, in the axial direction.

Thus, there is a need to use DH to provide an approximate realization of the 3D form of a free-flowing particle or cluster of particles without trapping and without lenses such that a large sensing volume is achieved.

SUMMARY OF THE INVENTION

Embodiments of the present invention are directed toward apparatus for and methods of obtaining images of free-flowing aerosol particles from three orthogonal directions using digital holography. Embodiments of the invention generally use diode lasers of different wavelengths to simultaneously illuminate flowing particles and form digital holograms on separate sensors. Images of the same particles from orthogonal perspectives are reconstructed from these holograms and used to infer the three-dimensional structure of the particles. The apparatus employs inexpensive components and does not require lenses to achieve the imaging, giving it a large sensing volume.

Embodiments of the present invention permit images of particles to be obtained from three directions in a contact-free manner. In certain embodiments of the present invention no lenses are used, which provides a large working volume and enables high through put of particle material. The described algorithms are used to approximately reconstruct single or multiple particle morphology in three dimensions.

Embodiments of the present invention can be manufactured from relatively inexpensive parts and have a small form factor enabling use of the present invention, for example, on an unmanned aerial vehicle (UAV) or as a sensor network. The 3D particle-information provided could aid in particle classification, identification, or differentiation.

In one embodiment, there is provided an imaging apparatus for creating a three-dimensional image of particles suspended within a fluid. The imaging apparatus comprises a housing configured to receive a flow of the fluid containing the particles, and first, second, and third lasers configured to emit respective first, second, and third laser beams into the housing. Each of the first, second, and third lasers are oriented such that each of the first, second, and third laser beams are directed into the housing at an angle that is substantially orthogonal to each of the other laser beams. The apparatus further comprises first, second, and third optical sensors located within the housing and positioned opposite the first, second, and third lasers, respectively. Each of the first, second, and third optical sensors are operable to generate a two-dimensional silhouette of the particles passing through the housing.

In another embodiment, there is provided a method of forming a three-dimensional image of particles suspended within a fluid. The method comprises introducing the fluid comprising the particles to an imaging apparatus and illuminating the particles by simultaneously emitting first, second, and third laser beams from first, second, and third lasers, respectively, into the imaging apparatus. The illuminating forms a plurality of two-dimensional particle silhouettes on first, second, and third optical sensors positioned opposite the first, second, and third lasers, respectively. The three-dimensional image is formed using the plurality of two-dimensional particle silhouettes.

Additional features of the present invention are described in more detail in the following pages.

wherein $$I_r^{con}$$

Figure 2A:
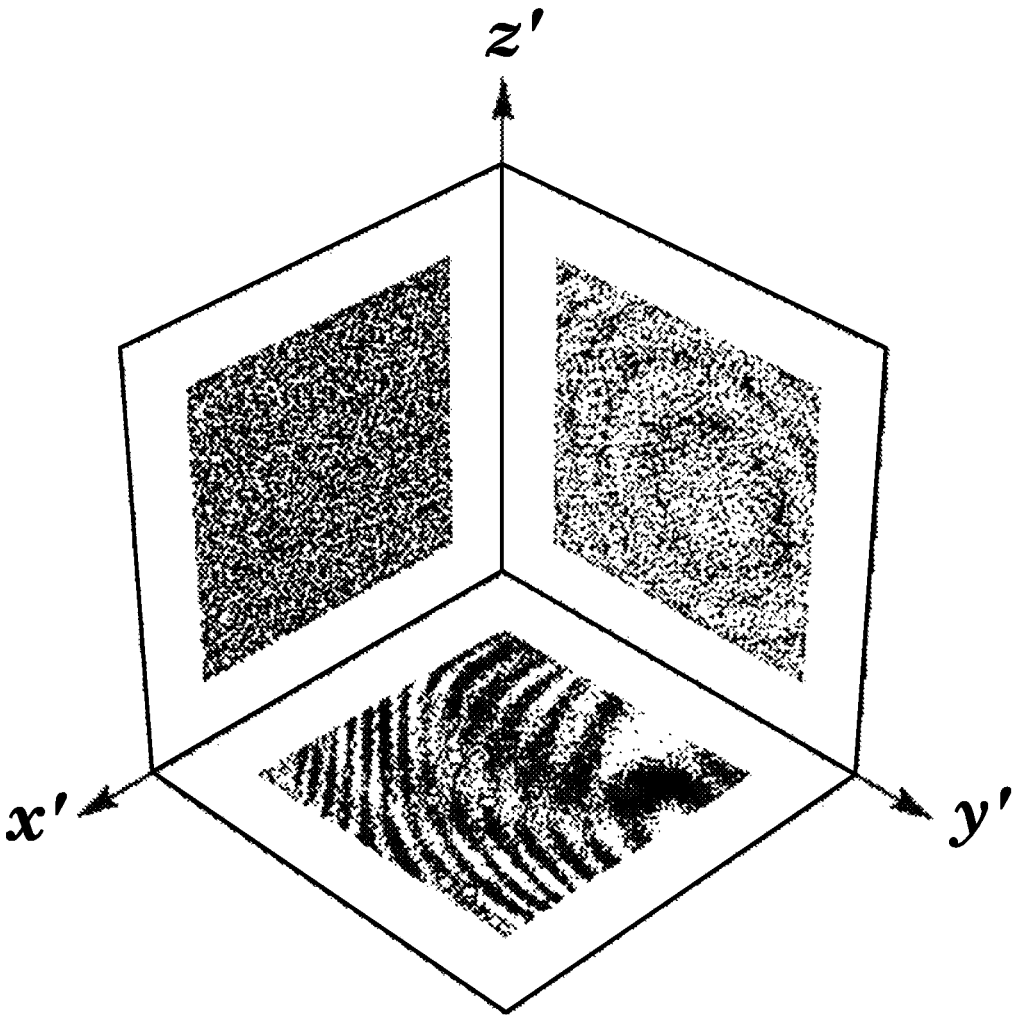
FIG. 2A is a coordinate system showing contrast holograms $$I_r^{con}, I_g^{con}, \text{ and } I_b^{con},$$
Figure 2B:
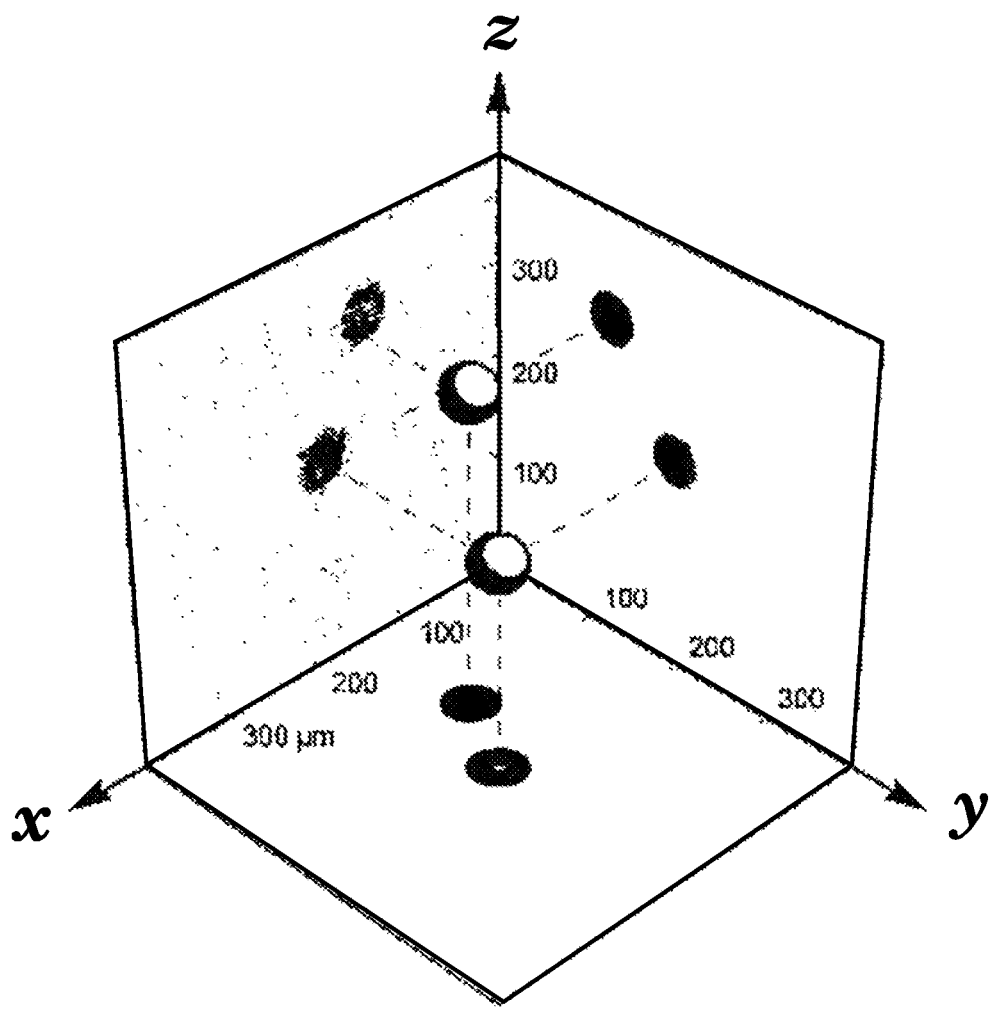
Figure 2C:
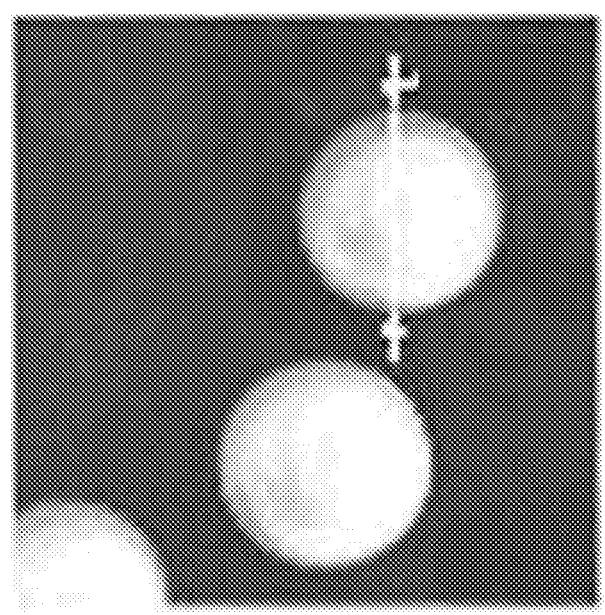
Figure 3A:
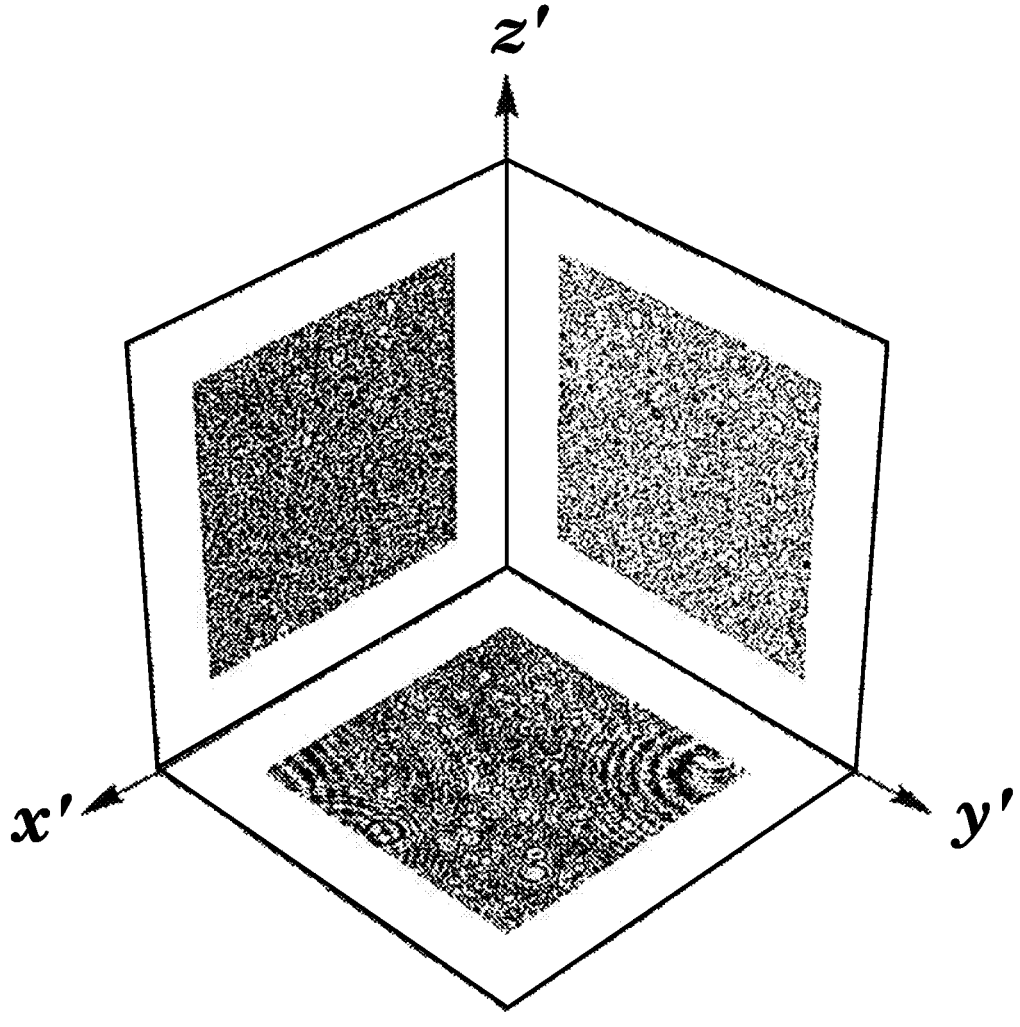
Figure 3B:
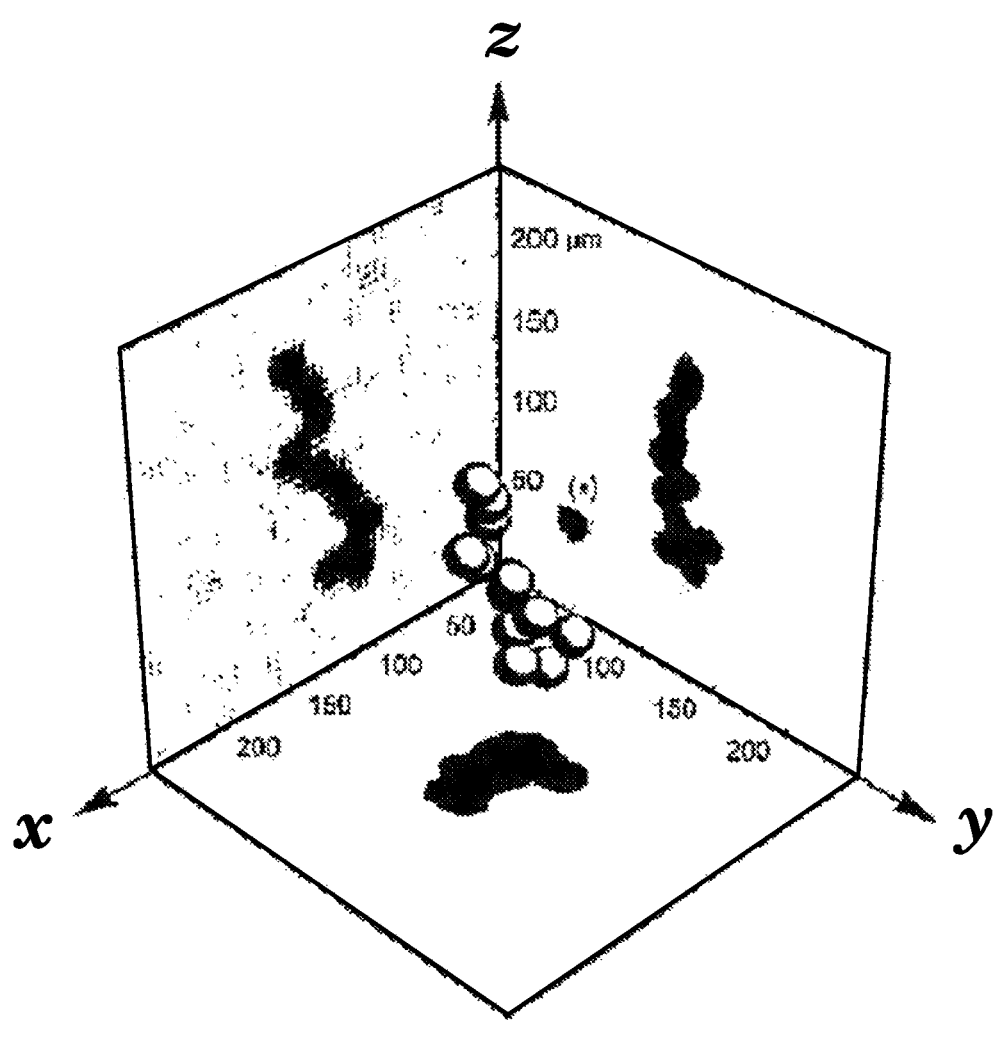
Figure 3C:
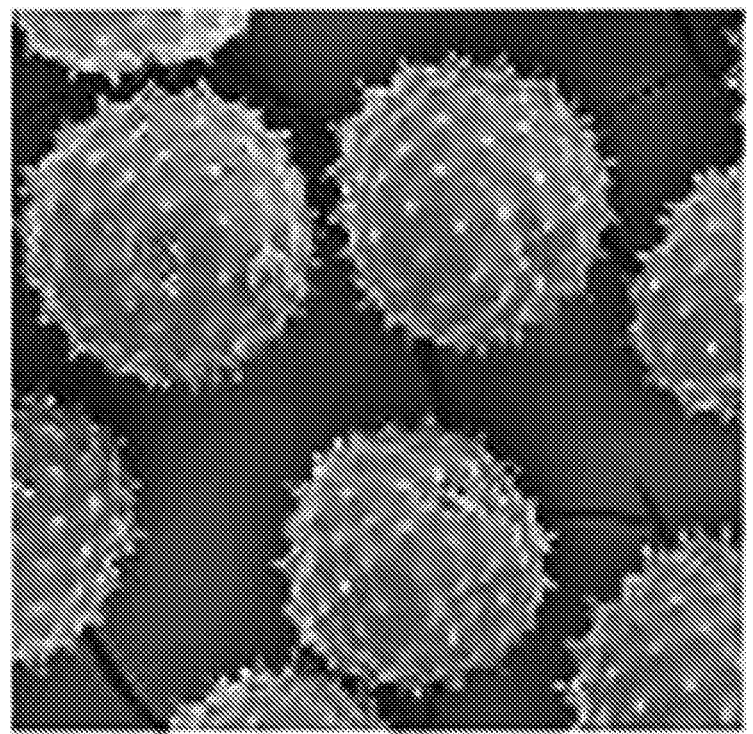

is shown on the plane formed by axes x' and y', $$I_g^{con}$$

is shown on the plane formed by axes y' and z', and $$I_b^{con}$$

is shown on the plane formed by axes x' and z';

FIG. 2B is a coordinate system showing two-dimensional particle silhouettes for each viewing direction of three orthogonally arranged sensors formed using the contrast holograms of FIG. 2A;

FIG. 2C is an electron micrograph of glass sphere particles with ~50 μm diameter;

FIG. 3A is a coordinate system showing contrast holograms $$I_r^{con}, I_g^{con}, \text{ and } I_b^{con},$$

wherein $$I_r^{con}$$

is shown on the plane formed by axes x' and y', $$I_g^{con}$$

is shown on the plane formed by axes y' and z', and $$I_b^{con}$$

is shown on the plane formed by axes x' and z';

FIG. 3B is a coordinate system showing particle silhouettes generated from the holograms of FIG. 3A for a single particle-cluster;

FIG. 3C is an electron micrograph of pollen grains, which are ~21-22 μm diameter.

DETAILED DESCRIPTION OF THE PREFERRED EMBODIMENT

Figure 1A:
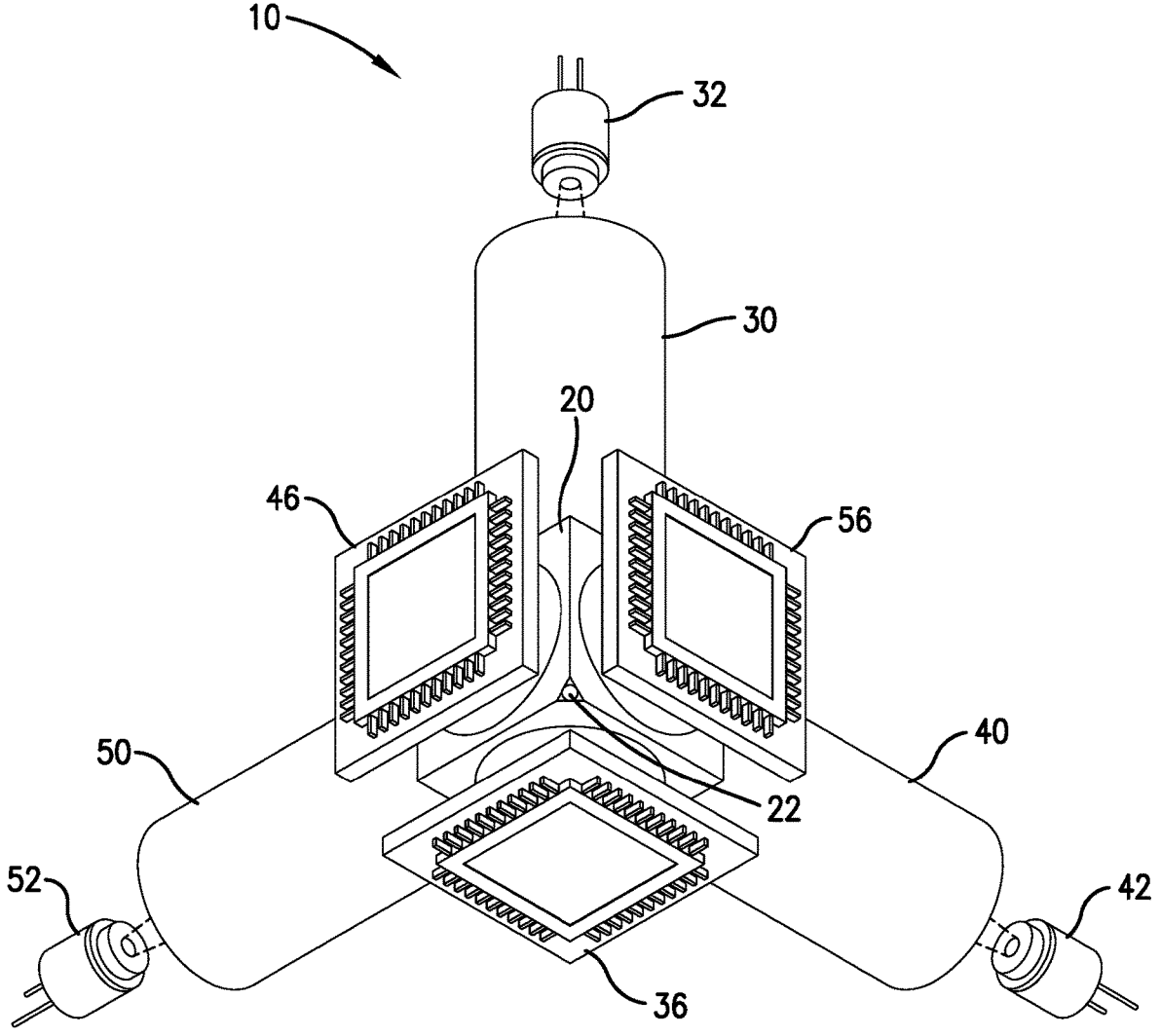
FIG. 1A is a perspective view of an orthographic imaging apparatus according to one embodiment of the present invention.

Turning to FIG. 1A, an exemplary orthographic imaging apparatus 10 is shown. In the embodiment shown, imaging apparatus 10 generally comprises central housing 20. In certain embodiments, housing 20 is in the form of a hollow "mounting" cube. Housing 20 may be constructed of various materials, such as metals (such as aluminum), plastics, ceramics, and the like. Housing 20 further comprises inlet port 22 and outlet port 24, through which the particles to be imaged are permitted to enter and exit internal chamber 26, as described in greater detail below. Housing 20 and other components of imaging apparatus 10 may be of various sizes and dimensions, depending on the particular application. However, in certain embodiments, housing 20 is sized so as to provide an imaging volume within internal particle chamber 26 of about 0.1 cm³ to about 100 cm³, preferably about 0.5 cm³ to about 50 cm³, and more preferably about 1 cm³ to about 10 cm³.

Apparatus 10 further comprises first laser 32, second laser 42, and third laser 52. Each laser (32, 42, 52) is configured to emit a beam into internal particle chamber 26 of central housing 20. In certain embodiments, each laser (32, 42, 52) is oriented substantially orthogonal to each of the other lasers (i.e., at right angles relative to each other). Thus, when viewed in a three-dimensional coordinate system, one laser is positioned to emit light along the x axis, another laser is positioned to emit light along the y axis, and the final laser is positioned to emit light along the z axis. In certain embodiments, one or more of first laser 32, second laser 42, and/or third laser 52 is a diode laser.

In certain embodiments, each laser (32, 42, 52) is configured to emit a laser beam at a different wavelength. For example, lasers (32, 42, 52) can be configured to emit beams as different colors within the visible light spectrum (e.g., red, blue, and green). In certain embodiments, a first laser beam is emitted from first laser 32 and comprises (consists of, or consists essentially of) red light having an average wavelength of about 635 nm to about 700 nm. In certain embodiments, a second laser beam is emitted from second laser 42 and comprises (consists of, or consists essentially of) green light having an average wavelength of about 520 nm to about 560 nm. In certain embodiments, a third laser beam is emitted from third laser 52 and comprises (consists of, or consists essentially of) blue light having an average wavelength of about 450 nm to about 490 nm.

In certain embodiments, first laser 32, second laser 42, and third laser 52 are positioned adjacent first elongated tube 30, second elongated tube 40, and third elongated tube 50, respectively. In the embodiment shown, each of first elongated tube 30, second elongated tube 40, and third elongated tube 50 are coupled to, and preferably attached to, housing 20. Thus, in certain such embodiments, each laser (32, 42, 52) is configured to emit a beam through the corresponding elongated tube (30, 40, 50) into particle chamber 26.

First elongated tube 30, second elongated tube 40, and third elongated tube 50 are each generally configured to direct laser beams emitted from respective lasers (32, 43, 52) into particle chamber 26 of housing 20. In certain embodiments, the elongated tubes (30, 40, 50) may be in the form of lens tubes, which can be configured to mount lasers (32, 42, 52) and/or direct the laser beams emitted from lasers (32, 42, 52) into particle chamber 26 while shielding particle chamber 26 from interference from external light. Thus, elongated tubes (30, 40, 50) are similarly oriented substantially orthogonal to each of the other elongated tubes (i.e., at right angles relative to each other). That is, when viewed in a three-dimensional coordinate system, one of the elongated tubes is positioned along the x axis, another of the elongated tubes is positioned along the y axis, and the final of the elongated tubes is positioned along the z axis.

In certain embodiments, one or more (or all three) of first elongated tube 30, second elongated tube 40, and third elongated tube 50 do not include a lens. That is, when the laser beams are emitted from lasers (32, 42, 52), the laser beams do not pass through glass or other clear lens materials before entering particle chamber 26. Advantageously, the absence of lenses in the elongated tubes (30, 40, 50) provides a larger working volume for particle image capture and enables a higher through-put of particle material than prior imaging systems. Elongated tubes (30, 40, 50) may be of various dimensions as needed or desired for the particular application. In certain embodiments, one or more of elongated tubes (30, 40, 50) may have an average diameter of about 1 mm to about 100 mm, preferably about 10 mm to about 50 mm.

Figure 1B:
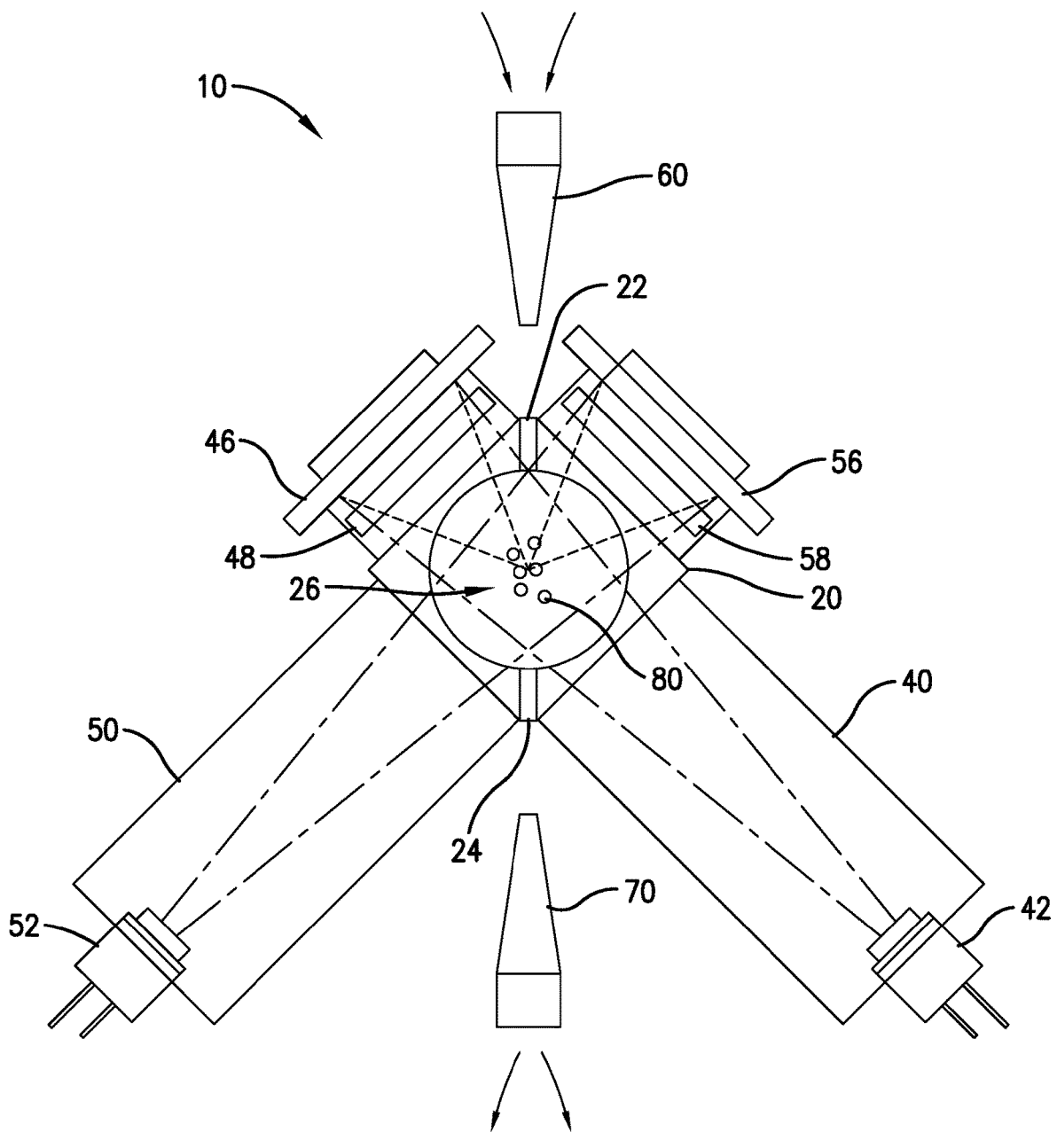
FIG. 1B is a top internal view of the orthographic imaging apparatus of FIG. 1A and also shows the unscattered and scattered light from the particles that forms the holograms.

In certain embodiments, imaging apparatus 10 further comprises optical sensors (36, 46, 56) within housing 20 opposite each laser (32, 42, 52) (i.e., positioned along the same axis and facing the laser). As shown in FIG. 1A and FIG. 1B, optical sensors (36, 46, 56) are coupled to, and preferably attached (permanently or removably) to, central housing 20. In certain embodiments, one or more of optical sensors (36, 46, 56) is a board-level monochrome CMOS sensor. Optical sensors (36, 46, 56) are operable to create a hologram of the particles introduced into housing 20. In certain embodiments, a processor is generally provided that is operable to construct a three-dimensional form for the particles based upon a two-dimensional view reconstructed from each hologram.

In certain embodiments, one or more of the optical sensors (36, 46, 56) are preferably preceded by a filter, and preferably a bandpass filter, that permits passage of a single portion of the light spectrum and attenuates all others. For example, in certain embodiments, optical sensor 36 comprises a red bandpass filter (not shown, but similar to 48 and 58 below) configured to permit only light having a wavelength of about 635 nm to about 700 nm to pass through and be detected by optical sensor 36. In certain embodiments, optical sensor 46 comprises a green bandpass filter 48 configured to permit only light having a wavelength of about 520 nm to about 560 nm to pass through and be detected by optical sensor 46. In certain embodiments, optical sensor 56 comprises a blue bandpass filter 58 configured to permit only light having a wavelength of about 450 nm to about 490 nm to pass through and be detected by optical sensor 56.

In certain embodiments, imaging apparatus 10 may further comprise inlet conduit 60 positioned adjacent to inlet port 22 and configured to introduce a fluid comprising a quantity of particles 80, into internal particle chamber 26 of housing 20. As shown in FIG. 1B, conduit 60 may be in the form of a nozzle that directs the fluid toward and through port 22. However, in certain other embodiments, other types of conduits may be used. Additionally, although there is space shown in FIG. 1B between conduit 60 and port 22, it should be understood that conduit 60 may be connected to, or integrally formed with, port 22.

In certain embodiments, imaging apparatus 10 may further comprise outlet conduit 70 positioned adjacent outlet port 24 and configured to remove the fluid comprising particles 80 from internal particle chamber 26 of housing 20. As shown in FIG. 1B, conduit 70 may be in the form of a vacuum nozzle. However, in certain other embodiments, other types of conduits may be used. Additionally, although there is space shown in FIG. 1B between conduit 70 and port 24, it should be understood that conduit 70 may be connected to, or integrally formed with, port 24.

Embodiments of the present invention are directed to methods for orthographic imaging of particles suspended in a fluid. As described above, three individual lasers (32, 42, 52) are positioned along separate axes and arranged at right angles relative to each other. Lasers (32, 42, 52) operate to simultaneously emit laser beams toward internal particle chamber 26 located within housing 20. Preferably, each laser beam is transmitted at a different wavelength. In certain embodiments, before introducing particles 80 into imaging apparatus 10, a plurality of two-dimensional background images is captured by optical sensors (36, 46, 56) by simultaneously pulsing a first laser beam, a second laser beam, and a third laser beam from first laser 32, second laser 42, and third laser 52, respectively, into housing 20, and particularly into particle chamber 26, thereby exposing sensors (36, 46, 56) when no particles are present.

To begin capture of the particle images, a free-flowing fluid comprising a quantity of particles 80 suspended therein is introduced into internal particle chamber 26 of housing 20. In certain embodiments, the quantity of particles 80 is in the form of an aerosol composition, with particles 80 suspended in air or other gas. In certain embodiments, the quantity of particles 80 has an average particle size (measured as the largest diameter) of about 0.1 µm to about 1000 µm, preferably about 0.5 µm to about 500 µm, more preferably about 1 µm to about 100 µm, and most preferably about 20 µm to about 50 µm. In certain embodiments, the quantity of particles 80 are introduced by feeding (actively or passively) the fluid comprising particles 80 through inlet port 22. In certain embodiments, the fluid comprising particles 80 is directed through inlet port 22 using inlet conduit 60 positioned adjacent inlet port 22, as shown in FIG. 1B. The flow rate of the fluid and particles 80 will largely depend on the size of internal chamber 26 and holes 22, 24. However, the fluid comprising particles 80 is generally fed through inlet port 22 at a velocity of about 0.1 m/s to about 100 m/s, preferably about 0.5 m/s to about 50 m/s, and more preferably about 1 m/s to about 10 m/s.

Once particles 80 are within internal chamber 26 of housing 20, the particles are illuminated by simultaneously pulsing a first laser beam, a second laser beam, and a third laser beam, emitted from first laser 32, second laser 42, and third laser 52, respectively. During the pulsing, the laser beams emitted by each laser simultaneously impinge upon respective surfaces of particles 80. In certain embodiments, the illuminating comprises simultaneously emitting each laser beam from lasers (32, 42, 52) for a duration of about 1 nanosecond to about 1000 nanoseconds, preferably about 50 nanoseconds to about 500 nanoseconds, and more preferably about 100 nanoseconds to about 250 nanoseconds.

The illuminating forms a plurality of two-dimensional particle silhouettes on optical sensors (36, 46, 56). In certain embodiments, the plurality of particle silhouettes is formed by subtracting the plurality of two-dimensional background images (without particles) from the plurality of two-dimensional images captured during illuminating the particles. As noted above, optical sensors (36, 46, 56) are positioned opposite each respective laser (32, 42, 52). Thus, each sensor (36, 46, 56) records a hologram of the particles 80 as viewed directly across from lasers (32, 42, 52). Each hologram is then used to reconstruct a two-dimensional image of the particles. The plurality of two-dimensional silhouette images is then used to form a three-dimensional representation of the particles 80 in space, as described in the examples below.

Finally, after illuminating and image capturing, the fluid comprising particles 80 may be removed from imaging apparatus 10, specifically from internal particle chamber 26, through outlet port 24. In certain embodiments, the fluid comprising particles 80 is removed through outlet port 26 using outlet conduit 70, and preferably a vacuum conduit such as a nozzle, positioned adjacent outlet port 26, as shown in FIG. 1B.

Additional advantages of the various embodiments of the invention will be apparent to those skilled in the art upon review of the disclosure herein and the working examples below. It will be appreciated that the various embodiments described herein are not necessarily mutually exclusive unless otherwise indicated herein. For example, a feature described or depicted in one embodiment may also be included in other embodiments, but is not necessarily included. Thus, the present invention encompasses a variety of combinations and/or integrations of the specific embodiments described herein.

As used herein, the phrase "and/or," when used in a list of two or more items, means that any one of the listed items can be employed by itself or any combination of two or more of the listed items can be employed. For example, if a composition is described as containing or excluding components A, B, and/or C, the composition can contain or exclude A alone; B alone; C alone; A and B in combination; A and C in combination; B and C in combination; or A, B, and C in combination.

The present description also uses numerical ranges to quantify certain parameters relating to various embodiments of the invention. It should be understood that when numerical ranges are provided, such ranges are to be construed as providing literal support for claim limitations that only recite the lower value of the range as well as claim limitations that only recite the upper value of the range. For example, a disclosed numerical range of about 10 to about 100 provides literal support for a claim reciting "greater than or equal to about 10" (with no upper bounds) and a claim reciting "less than or equal to about 100" (with no lower bounds).

EXAMPLE

The following example sets forth an exemplary apparatus and imaging method within the scope of embodiments of the present invention. It is to be understood, however, that these examples are provided by way of illustration and nothing therein should be taken as a limitation upon the overall scope of the invention.

This example presents an experiment where three two-dimensional (2D) images of several types of free-flowing aerosol particles are obtained using in-line digital holography (DH) without the need to collect, confine, or otherwise trap the particles. Two specific types of particles are considered: individual spherical glass particles and aggregates of optically opaque sphere-like pollen grains in a non-spherical arrangement. The multiple 2D images are generated by a focusing procedure and are then back-projected into the sensing volume (discussed below) to infer the 3D shape of the particle or cluster. The geometry of a sphere is used as a "base element," or geometric primitive, to express the 3D form because the particles are either spheres or clusters thereof.

The apparatus shown in FIGS. 1A and 1B achieves this goal. A hollow mounting cube with 25.4 mm diameter threaded holes through each face is shown in FIG. 1A. In three of the holes that share a common cube-corner are 25.4 mm diameter lens tubes (although no lenses are used). Mounted to the ends of each tube is a diode laser (DL), each emitting at a different wavelength: $\lambda_r$=660 nm or "red" for short, $\lambda_g$=520 nm, or "green," and $\lambda_b$=450 nm, "blue." The beam path for the blue and green DLs can be seen in the side view in FIG. 1B. Opposite each DL at the far cube-face is a bandpass filter, corresponding to the DL's wavelength, followed by a board-level monochrome CMOS sensor. A hole ~1 mm in diameter is drilled through the cube along its main diagonal from one apex to another as shown in FIGS. 1A and 1B. The hole allows an aerosol stream to be passed from top to bottom through the central region of the cube where the particles are simultaneously illuminated by the three orthogonal DLs and the resulting holograms are recorded.

Board-level sensors are used to allow the hologram recording to be as close to the aerosol stream as practical, which improves the eventual image resolution and gives the apparatus a small form-factor of approximately 10×10×10 cm. These sensors (FLIR, BFS-U3-50S5-BD) have an array size of 2448×2048 pixels, with a pixel size of 3.45×3.45 μm, and a global shutter readout. Clear hologram fringes are recorded by pulsing the DLs simultaneously to emit for a 200 ns period after the electronic-shutter activation, having the effect of freezing-out the particle motion.

The purpose of the bandpass filters is to ensure that only light from the DL across the cube from a sensor reaches that sensor's surface. In other words, the filters prevent optical "cross talk" between the sensors. This is preferable to pulsing the DLs sequentially because the likelihood that the particles would change orientation between each pulse.

Because each hologram is formed by illuminating the same group of particles from a different orthogonal direction, the 3D form of a given particle can be inferred from the 2D images, or "views," that are reconstructed from each hologram. As will be seen below, this inference is incomplete and only approximate, yet is vastly better than what is typically achieved from a single viewing direction in lensless DH.

Particle-image reconstruction begins with a background measurement, which is simply an exposure of the sensors to the DL pulses when no particles are present. This background is then subtracted from the same measurement when the particles are present. The result is a contrast hologram $I^{con}$ of which there are three corresponding to the orthogonal views:

$$I_r^{con}, I_g^{con}, \text{ and } I_b^{con}.$$

Both the particle-free and particle-present exposures are obtained with synchronized DL pulses ~200 ns in duration. Each contrast hologram is then used in the Fresnel-Kirchhoff integral, $$K_n(\eta, \xi) = \gamma_n \int \int_S I_n^{con}(\eta', \xi') g(\eta, \xi, \eta', \xi') d\eta' d\xi', \tag{1}$$

which is simplified here by use of the Fresnel approximation in that $$g(\eta, \xi, \eta', \xi') = \exp\left\{\frac{ik_n}{2d_n}\left[(\eta - \eta')^2 + (\xi - \xi')^2\right]\right\}. \tag{2}$$

In Eqs. (1)-(2), n={r, g, b} to denote the three DL wavelengths $\lambda_n$, $\gamma_n$=id$_n/\lambda_n$, $k_n$=2 $\pi/\lambda_n$, S is the surface of the $n^{th}$ sensor where contrast hologram $$I_n^{con}$$

is measured, and $d_n$ is the particle-sensor separation, or "focus distance," for the $n^{th}$ view. Evaluating $|K_n|^2$ gives the 2D particle image for $n^{th}$ view by iteratively adjusting the value of $d_n$ until the image develops a clear focus using a simple sharpness metric.

Figure 1C:
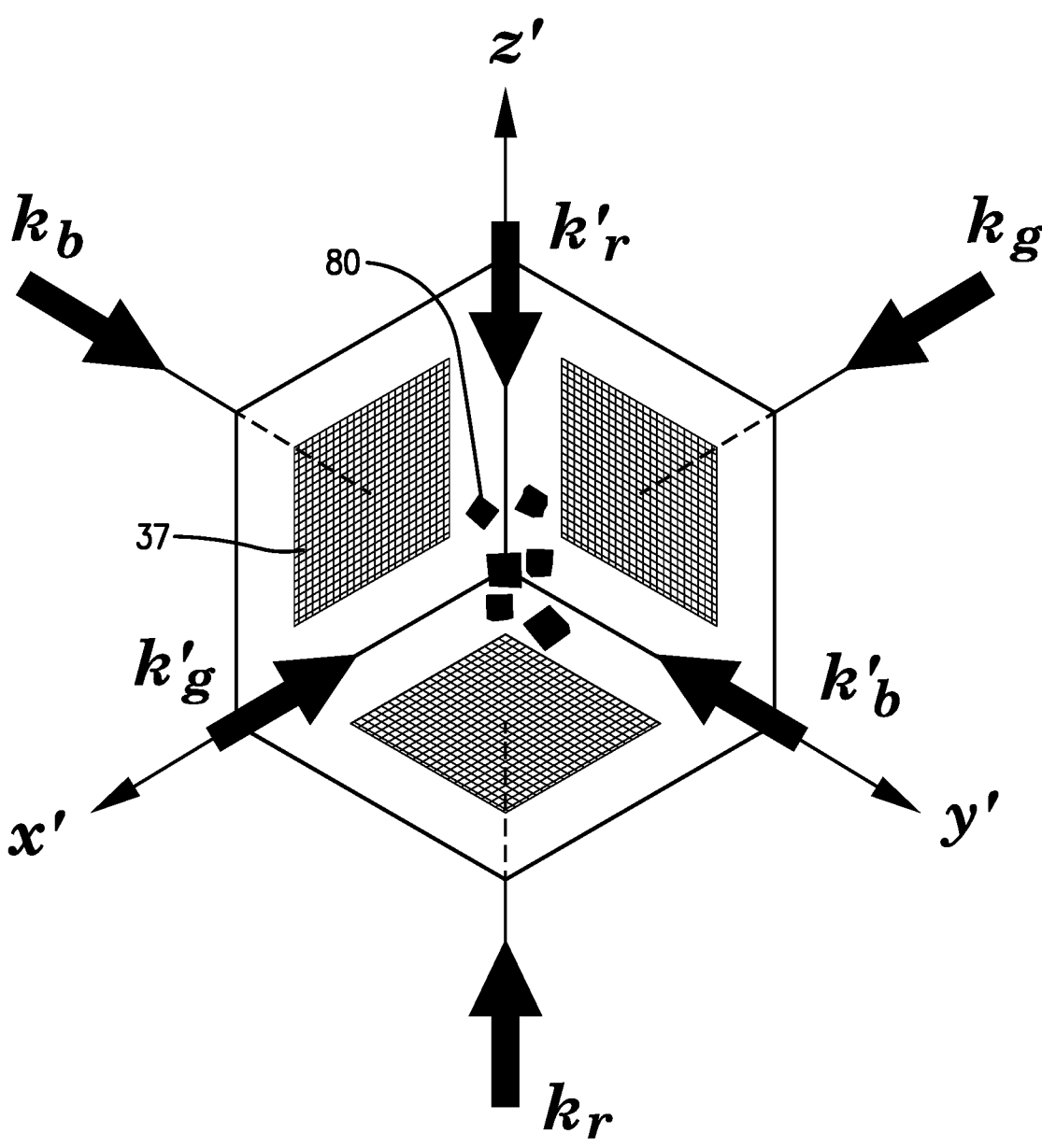
FIG. 1C is a coordinate system showing the three sensor surfaces from the imaging apparatus of FIGS. 1A and 1B, and defining the sensor surface (37), the particles (80), and the physical and reconstruction wave vectors, $k'_n$ and $k_n$.

The 2D views must then be assessed in 3D space in a way that best conveys a particle's 3D form. To explain how this is done, refer to FIG. 1C, where the sensor surfaces are shown in the sensor coordinate system (x', y', z'), abbreviated as SCS, along with the corresponding DL wave vectors, $$k_n'.$$

Equation (1) is evaluated for each $$I_n^{con}$$

using auxiliary coordinates ($\eta'$, $\xi'$) and a reconstruction wave vector $$k_n = -k_n',$$

where the coordinate associated with $k_n$ is perpendicular to the ($\eta'$, $\xi'$) plane. The particle images then reside in the particle coordinate system (x, y, z), or PCS. For example, consider the red viewing direction, n=r. Here, the auxiliary coordinates would be $\eta'$=x' and $\xi'$=y' because $$I_r^{con}$$

resides in the (x', y') plane in the SCS. If the physical wave vector $$k_r' = k_r \hat{z}$$

were used to evaluate Eq. (1), the particle image would be generated in the ($\eta$=x, $\xi$=y) plane in the PCS at a distance $d_r$ along the negative z-axis, i.e., one obtains the virtual particle-image.

Using the reconstruction wave vector $k_r$ generates the image along the positive z-axis where the particles actually reside. In other words, the reconstruction uses the back-propagation of the DL light. Alternatively, $$k_r'$$

can be used provided $d_r \rightarrow -d_r$, which can be seen to have the same effect from Eq. (2).

Once reconstructed, the three 2D images are positioned in the PCS such that each corresponds to the geometric projection of the particles along a given viewing direction.

FIGS. 2A, 2B, and 2C show an example of orthographic imaging of free-flowing 50 μm ∅ spherical aerosol particles. In FIG. 2A, the contrast holograms $$I_r^{con}, I_g^{con}, \text{ and } I_b^{con}$$

are shown color-coded to denote the DL wavelength. Evaluating Eq. (1) as described in the text generates the 2D particle silhouettes for each viewing direction, shown in FIG. 2B. The holograms and silhouettes are color-coded to match the DL light. The dashed lines show how the center points of the silhouettes are back-projected into 3D space to identify the location of each particle, where a sphere is then drawn. FIG. 2C is an electron micrograph of the glass sphere with ~50 μm diam.

In the example of FIGS. 2A, 2B, and 2C, the particles are a powder of glass microspheres with mean radii of $R_s$=25 μm that are aerosolized and passed to the injection nozzle (IN), such as shown in FIG. 1B. A large number of particles pass through the beams at ~1 m/s velocity and are removed by another nozzle (VN) by a weak vacuum line. Simultaneously pulsing the DLs results in the contrast holograms shown in FIG. 2A, which are color-coded to match the DL wavelengths. Each exhibit an intricate fringe pattern with features associated with individual particles. Application of Eq. (1) to these holograms yields the orthographic images shown in FIG. 2B in the PCS where the silhouettes are color coded similar to FIG. 2A. Note that the holograms in FIG. 2A are slightly cropped to a square size of 2048×2048 pixels rather than the full-sensor size of 2448×2048 pixels.

By surveying the relative positions of all silhouettes in the three views in the PCS, it is usually possible to identify a "fiducial" silhouette in each view that corresponds to the same, single particle. A circle is then drawn enclosing this silhouette in each view, defining three radii $R_r$, $R_g$, and $R_b$. From each radius, a scale factor $\alpha_n$ is determined such that the radii equal the known particle size, i.e., $a_r R_r = a_g R_g = a_b R_b = R_s$. This procedure addresses the different image-magnification effects due to the different wavelengths and the divergence of the DL beams, which is approximately 10°. The centers of these circles allow the views to be correctly positioned in the PCS by translating each image in its own plane such that back projection of the circles corresponds to the center of a single spherical particle. FIG. 2B shows dashed lines denoting this back-projection to two spheres from the corresponding view silhouettes. Note that the 3D sphere shapes here are artificially drawn, i.e., they are geometric primitives, while the silhouettes are real images that validate the use of these primitives.

Once the scale factors $\alpha_n$ are identified, other particle types can be investigated with the PCS axes now scaled to micrometers. An example is presented in FIGS. 3A, 3B, and 3C, which shows orthographic imaging of a ragweed pollen aerosol. In this example, a powder of dried, dead ragweed pollen grains is used as the particle source. These are sphere-like particles approximately 20-30 μm diameter with an echinate surface that promotes clustering of individual grains. As such, the use of spheres as geometric primitives is again justified. In analogy to FIGS. 2A and 2B, FIG. 3A shows the contrast holograms and FIG. 3B shows the particle silhouettes generated from those holograms for a single particle-cluster. Following alignment of the 2D views via inscribing circles as described in the text, sphere primitives of equal size are placed in 3D space such that their projections onto each of the image planes best agree with the structure seen in each silhouette. To provide more detail, FIG. 3B also shows different perspectives of the blue and green views to highlight the correspondence between the silhouettes and the placement of the spheres. The isolated pollen grain labeled (*) is not associated with a sphere because it is visible only in the green view. FIG. 3C shows an electron micrograph of the pollen grains, which are ~21-22 μm diam.

The imaging process and results of this example are described in greater detail below. As noted above, the contrast holograms are presented in FIG. 3A and the resulting views are shown in FIG. 3B. As before, a circle enclosing the silhouette of a single cluster is drawn in each view and the views are then positioned in 3D space via the circles' centers in the PCS. Once positioned, 22 μm diameter spheres are placed in the PCS such that their projections onto the image planes approximately agree with the silhouettes. This sphere size is determined from the blue and green views, where outlines of individual grains in most of the cluster can be discerned. FIG. 3B shows the result of this process, where the blue and green-views are included as insets. Close inspection reveals a small degree of misalignment between the spheres and projections, which is more an effect of parallax than misplacement. Small-scale features of the cluster are not captured by this process such as the surface roughness of individual grains and void spaces between grains. This is due to the limited image-resolution of the apparatus, which is estimated as 10 μm from the features that do appear clear in FIG. 3B. One can also see a lone grain silhouette in the green view in FIG. 3B indicated by (*) that is not seen in the other views, and thus, is not represented by a sphere.

The utility of this imaging approach can be appreciated from FIG. 3B in that if one were provided a single view only, it would be unlikely to generate a reasonable 3D rendering of the full particle-cluster. Consider the red view in FIG. 3B as an example. While this view gives an approximate sense for the overall size of the cluster, is does not clearly reveal that the particle is a cluster of spherical grains like the other views do. Indeed, from the red view alone, one may not realize the comparatively long extent of the cluster along the z-axis (axial direction for this view).

The knowledge of the 2D image of the same cluster from the different orthogonal directions is the key property that allows this method to work. For example, consider the red viewing direction in FIG. 3B again. The individual pollen grains of the cluster have different axial and transverse positions with respect to the z-axis that obscure their 3D location. All that can be determined from the red view is the transverse location of an undetermined number of overlapping sphere primitives; the axial positions are completely obscured and some are not well focused. However, when this same cluster is viewed from the other directions, the transverse locations become known for those views, which identifies the correct axial position for the obscured view. It is then possible to infer the locations of all the spheres. Of course, this approach cannot work if the image resolution prevents a clear silhouette, and it would not be possible to resolve the location of a particle that is obscured by other particles in all three views. The latter case could occur for more compact clusters and aerosol streams involving a large number density of particles.

A useful aspect of this method is the absence of lenses, which gives it nearly an order of magnitude larger sensing volume than what is typically possible in conventional microscopy. In principle, any particle that occupies the overlap volume of the three DL beams, which is approximately 1 cm³, will contribute to the holograms and can be imaged in this way.

While the idea to use multiple silhouettes to obtain 3D information of particle form may not be new, the application to free-flowing aerosols with all three orthogonal views is. Most comparable methods require either fixing, trapping, or confinement of the particles. Microscope objectives are also employed resulting in a much-reduced sensing volume. Applying such methods to free flowing aerosol particles would be difficult because the particle motion even in moderate flow velocities (~1 m/s) will washout the hologram interference pattern unless pulsed illumination is used on the 100's of ns time scale. Also, note that the pollen grains in the example above are opaque, and thus the attractive methods based on transparent phase objects, such as biological cells in water, have not been applied to such aerosol particles as far as we know.

At the time of the present invention, there were no known commercial instruments that determine the shape of freely flowing aerosol particles. Given the design simplicity, small form-factor, and large sensing volume of the apparatus in FIGS. 1A and 1B, it is believed that such instruments could be deployed on unmanned aerial vehicles.

The invention claimed is:

1. An imaging apparatus for creating a three-dimensional image of particles suspended within a gas comprising:
   a housing configured to receive a flow of the gas containing the particles;
   first, second, and third lasers configured to emit respective first, second, and third laser beams into the housing,
   wherein each of the first, second, and third lasers are oriented such that each of the first, second, and third laser beams are directed into the housing at an angle that is substantially orthogonal to each of the other laser beams;
   first, second, and third optical sensors coupled to the housing and positioned opposite the first, second, and third lasers, respectively, each of the first, second, and third optical sensors being operable to simultaneously record a hologram interference pattern of the particles passing through the housing;
   wherein the imaging apparatus does not comprise lenses through which the respective laser beams are passed during operation of the imaging apparatus.

2. The imaging apparatus of claim 1, further comprising first, second, and third elongated tubes associated with the first, second, and third lasers, respectively, and through which the first, second, and third laser beams are passed, respectively.

3. The imaging apparatus of claim 2, wherein the first, second, and third elongated tubes are configured to mount the first, second, and third lasers and/or direct the first, second, or third laser beams into the housing while shielding the housing from interference from external light.

4. The imaging apparatus of claim 1, wherein:
the first laser beam comprises a red light having an average wavelength of about 635 nm to about 700 nm;
the second laser beam comprises a green light having an average wavelength of about 520 nm to about 560 nm; and/or
the third laser beam comprises a blue light having an average wavelength of about 450 nm to about 490 nm.

5. The imaging apparatus of claim 4, wherein:
the first optical sensor comprises a red bandpass filter configured to permit only light having a wavelength of about 635 nm to about 700 nm to pass through and be detected by the first optical sensor;
the second optical sensor comprises a green bandpass filter configured to permit only light having a wavelength of about 520 nm to about 560 nm to pass through and be detected by the second optical sensor; and/or
the third optical sensor comprises a blue bandpass filter configured to permit only light having a wavelength of about 450 nm to about 490 nm to pass through and be detected by the third optical sensor.

6. The imaging apparatus of claim 1, further comprising:
an inlet conduit positioned adjacent to an inlet port in the housing and configured to introduce the gas comprising the particles into a particle chamber defined within the housing; and
an outlet vacuum conduit positioned adjacent to an outlet port in the housing and configured to remove the gas comprising the particles from the particle chamber.

7. A method of forming a three-dimensional image of particles suspended within a gas, the method comprising:
introducing the gas comprising the particles to an imaging apparatus;
illuminating the particles by simultaneously emitting first, second, and third laser beams from first, second, and third lasers, respectively, into the imaging apparatus, wherein the first, second, and third laser beams do not pass through a lens,
wherein the illuminating simultaneously forms a hologram interference pattern on each of first, second, and third optical sensors positioned opposite the first, second, and third lasers, respectively; and
forming the three-dimensional image using the hologram interference patterns.

8. The method of claim 7, wherein before introducing the gas comprising the particles into the imaging apparatus, capturing a plurality of two-dimensional background images by simultaneously emitting the first, second, and third laser beams into the imaging apparatus to expose the first, second, and third optical sensors when no particles are present in the imaging apparatus.

9. The method of claim 8, wherein each of the hologram interference patterns are formed by subtracting a two-dimensional background image from a two-dimensional image captured during illuminating the particles.

10. The method of claim 7, wherein the illuminating comprises simultaneously pulsing each of the first, second, and third laser beams into the imaging apparatus for 1 nanosecond to 1000 nanoseconds.

11. The method of claim 7, wherein:
the first laser beam comprises a red light having an average wavelength of about 635 nm to about 700 nm;
the second laser beam comprises a green light having an average wavelength of about 520 nm to about 560 nm; and/or
the third laser beam comprises a blue light having an average wavelength of about 450 nm to about 490 nm.

12. The method of claim 7, wherein the imaging apparatus comprising:
a housing configured to receive a flow of the gas containing the particles;
wherein each of the first, second, and third lasers are oriented such that each of the first, second, and third laser beams are directed into the housing at an angle that is substantially orthogonal to each of the other laser beams; and
the first, second, and third optical sensors being coupled to the housing and positioned opposite the first, second, and third lasers, respectively, each of the first, second, and third optical sensors simultaneously recording the hologram interference pattern of the particles passing through the housing during the illuminating.

13. The method of claim 12, the imaging apparatus further comprising first, second, and third elongated tubes coupled to the housing and associated with the first, second, and third lasers, respectively, and through which the first, second, and third laser beams are passed during the illuminating.

14. The method of claim 12, wherein:
the first optical sensor comprises a red bandpass filter configured to permit only light having a wavelength of about 635 nm to about 700 nm to pass through and be detected by the first optical sensor;
the second optical sensor comprises a green bandpass filter configured to permit only light having a wavelength of about 520 nm to about 560 nm to pass through and be detected by the second optical sensor; and/or
the third optical sensor comprises a blue bandpass filter configured to permit only light having a wavelength of about 450 nm to about 490 nm to pass through and be detected by the third optical sensor.

15. The method of claim 12, wherein introducing the gas comprising the particles to the imaging apparatus comprises feeding the gas through an inlet port formed in the housing.

16. The method of claim 15, wherein the gas is fed through the inlet port using an inlet conduit positioned adjacent to the inlet port.

17. The method of claim 12, wherein, after illuminating the particles within the gas, removing the gas from the imaging apparatus through an outlet port formed in the housing.

18. The method of claim 17, wherein the gas is removed through the outlet port using an outlet vacuum conduit positioned adjacent the outlet port.

* * * * *